US006212886B1

(12) United States Patent
Sugiyama et al.

(10) Patent No.: US 6,212,886 B1
(45) Date of Patent: Apr. 10, 2001

(54) HYDRAULIC DRIVE SYSTEM AND DIRECTIONAL CONTROL VALVE APPARATUS IN HYDRAULIC MACHINE

(75) Inventors: Genroku Sugiyama, Ibaraki-ken; Toichi Hirata, Ushiku; Tsukasa Toyooka, Ibaraki-ken, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/117,682

(22) PCT Filed: Feb. 26, 1998

(86) PCT No.: PCT/JP98/00781

§ 371 Date: Aug. 3, 1998

§ 102(e) Date: Aug. 3, 1998

(87) PCT Pub. No.: WO98/38429

PCT Pub. Date: Sep. 3, 1998

(30) Foreign Application Priority Data

Feb. 27, 1997 (JP) .................................................... 9-044198

(51) Int. Cl.[7] ........................................................ F16D 31/02

(52) U.S. Cl. .................................. 60/422; 60/445; 60/468

(58) Field of Search ............................. 60/422, 468, 445; 91/447

(56) References Cited

U.S. PATENT DOCUMENTS 3,411,295 * 11/1968 Byers ..................................... 60/444
3,920,034 * 11/1975 Byers ..................................... 60/427
4,006,667 * 2/1977 Bianchetta et al. .................... 94/447
4,655,250 * 4/1987 Jackson ........................... 137/596.12
4,787,294 * 11/1988 Bowden ................................. 91/447

FOREIGN PATENT DOCUMENTS 1-275902 11/1989 (JP) .
3-213703 9/1991 (JP) .
7-63203 3/1995 (JP) .
8-128405 5/1996 (JP) .

* cited by examiner

*Primary Examiner*—F. Daniel Lopez
(74) *Attorney, Agent, or Firm*—Mattingly, Stangler & Malur

(57) ABSTRACT

A hydraulic drive system includes a closed center directional control valve connected to a hydraulic pump through a hydraulic fluid supply line and controlling a flow of a hydraulic fluid supplied to an actuator. A throttle and cutoff means for throttling and cutting off an unloading circuit depending on a operation amount of the directional control valve is installed in the unloading circuit interconnecting the hydraulic fluid supply line and a reservoir. The throttle and cutoff means comprises a logic valve including a feedback slit of which an opening area is increased and decreased depending on an amount by which a valve body is moved, and a pilot variable throttle for controlling a rate of a pilot flow passing the feedback slit depending on the operation amount of the directional control valve.

11 Claims, 11 Drawing Sheets

HYDRAULIC DRIVE SYSTEM AND DIRECTIONAL CONTROL VALVE APPARATUS IN HYDRAULIC MACHINE

TECHNICAL FIELD

The present invention relates to a hydraulic drive system equipped in construction machines such as hydraulic excavators and hydraulic cranes, and a directional control valve apparatus for use in the hydraulic drive system. More particularly, the present invention relates to a hydraulic drive system and a directional control valve apparatus each of which includes a closed center directional control valve and an unloading circuit for connecting a hydraulic fluid supply line of a hydraulic pump to a reservoir.

BACKGROUND ART

Directional control valves for use in a hydraulic drive system of hydraulic machines such as hydraulic excavators and hydraulic cranes are grouped into the open center type and the closed center type. One example of conventional directional control valve apparatus including an open center directional control valve is shown in FIG. 11.

In FIG. 11, a housing 101 includes a spool 102 inserted therein and displacing (through its stroke) depending on an input amount by which a control lever unit is operated. A feeder port 103 connected to a hydraulic pump and a bypass port 105 connected to a reservoir port 104 are formed in the housing 101 around a central portion of the spool 102. When the spool 102 is in a neutral position, the bypass port 105 is fully opened, causing all of a hydraulic fluid from the hydraulic pump to flow into a reservoir. As the spool 102 is moved to the left or right on the drawing, an opening area of the bypass port 105 is reduced, enabling part of the hydraulic fluid from the hydraulic pump to be supplied to an actuator through a meter-in throttle 102*a* or 102*b* and a load port 109*a* or 109*b*. When the spool 102 is in a full stroke position, the bypass port 105 is blocked off, enabling all of the hydraulic fluid from the hydraulic pump to be supplied to the actuator.

Additionally, denoted by 107*a*, 107*b* are overload relief valves and 108 is a load check valve, these valves being parts which are usually necessary for constructing the directional control valve apparatus. A not-shown main relief valve is also attached to the valve apparatus.

In the valve apparatus using such an open center directional control valve, since the bypass port 105 is throttled to have an opening corresponding to the input amount of the control lever unit, the so-called bleed control under which an actuator is driven while bleeding part of the delivery rate of a hydraulic pump can be effected at start-up of the actuator. The bleed control does not abruptly change the delivery pressure of the hydraulic pump and therefore provides a good operation feeling free from shocks imposed on the actuator.

On the other hand, a closed center directional control valve is a valve in which a feeder port is fully closed when a spool is in a neutral position. When combined with a pressure compensating valve, the closed center directional control valve can supply a hydraulic fluid to an actuator at a certain flow rate corresponding to the valve opening area regardless of variation in load pressure. However, since the closed center directional control valve is designed to always supply the actuator with the hydraulic fluid at a flow rate corresponding to the valve opening area, the delivery pressure of the hydraulic pump tends to change abruptly and the actuator tends to move so quickly. In view of such a problem, JP, A, 7-63203 proposes a hydraulic drive system which enables the bleed control to be effected in a hydraulic circuit including the closed center directional control valve as with the case of using the open center directional control valve.

The hydraulic drive system disclosed in JP, A, 7-63203 comprises a variable displacement hydraulic pump, a plurality of actuators driven by a hydraulic fluid delivered from the hydraulic pump, a plurality of closed center directional control valves for controlling flows of the hydraulic fluid supplied to the plurality of actuators, a plurality of control lever units for driving the plurality of directional control valves to operate, a bypass line connected to a hydraulic fluid supply line of the hydraulic pump, a bleed valve for returning the hydraulic fluid delivered from the hydraulic pump to a reservoir when the plurality of directional control valves are in neutral positions, and a controller for controlling the bleed valve to have an opening corresponding to an input amount by which the plurality of control lever units are operated.

In the hydraulic drive system thus constructed, the bleed valve functions like a center bypass throttle because the bleed valve is controlled to have an opening corresponding to the input amount of the control lever units. Accordingly, an equivalent operation feeling to that obtained in the bleed control using the open center directional control valve can be obtained while using a closed center valve as the directional control valve, thus resulting in good operability.

In the above-mentioned related arts, the bypass port 105 of the open center directional control valve and the bypass line described in JP, A, 7-63203 are both used for connecting the hydraulic fluid supply line of the hydraulic pump to the reservoir. Therefore, those port and line are referred to together as "an unloading circuit" in this Description.

DISCLOSURE OF THE INVENTION

The above-mentioned related arts however have the problems below.

First, in the valve apparatus using the open center directional control valve shown in FIG. 11, because the bypass port (unloading circuit) 105 is blocked off upon the operation of the spool 102, the spool 102 has an overall length extended corresponding to the presence of the bypass port 105, thus raising a difficulty in machining the spool with high accuracy, and the housing 101 has an increased length in its portion where the bypass port 105 is provided, thus increasing weight and cost of the housing and also raising a difficulty in manufacture of a molding. Particularly, in a construction machine having a plurality of driven members such as a hydraulic excavator and hydraulic crane, the valve apparatus is usually constructed as a multiple valve wherein respective spools of a plurality of directional control valves are arranged side by side, and in this case the additional housing weight resulted from the presence of the bypass port is increased in proportion to the number of the spools. Accordingly, the housing weight is so increased as to cause a considerable effect upon a manufacture cost.

On the other hand, in the hydraulic drive system disclosed in JP, A, 7-63203, the above-stated problems attributable to the open center directional control valve are not encountered because the directional control valve is itself a closed center valve. However, the controller for controlling the bleed valve provided in the unloading circuit is required to develop an equivalent function to that obtained in the bleed control using the open center directional control valve by using the closed center valve, thus resulting in a higher cost.

A first object of the present invention is to provide a hydraulic drive system and a directional control valve apparatus with which a spool can have a shorter axial length than required in an open center directional control valve, an improvement in machining accuracy and a more compact structure can be realized, and an equivalent function to that obtained by the open center directional control valve can be developed with no need of using a controller.

A second object of the present invention is to provide a directional control valve apparatus which is constructed as a multiple valve including a plurality of spools arranged side by side, which can develop an equivalent function to that obtained by the open center directional control valve, which can make a housing lighter and more compact than the case of using an open center directional control valve, and which can be manufactured at a reduced cost.

Features of the present invention to achieve the above objects and other associated features are as follows.

(1) To achieve the above first object, according to the present invention, in a hydraulic drive system comprising a hydraulic pump, an actuator driven by a hydraulic fluid delivered from the hydraulic pump, a closed center directional control valve connected to the hydraulic pump through a hydraulic fluid supply line and controlling a flow of the hydraulic fluid supplied to the actuator, an unloading circuit interconnecting the hydraulic fluid supply line of the hydraulic pump and a reservoir, and throttle and cutoff means installed in the unloading circuit for throttling and cutting off the unloading circuit depending on an amount by which the directional control valve is operated, the throttle and cutoff means comprises a logic valve, a pilot circuit including a pilot variable throttle to control a rate of a pilot flow for controlling an opening area of the logic valve depending on the rate of the pilot flow, and operation interlock means for changing an opening of the pilot variable throttle depending on the operation amount of the directional control valve.

In the present invention thus constructed, when the directional control valve is operated, the opening of the pilot variable throttle is changed by the operation interlock means depending on the operation amount of the directional control valve, and the rate of the pilot flow passing the pilot circuit is also changed. When the rate of the pilot flow is reduced, the opening of the logic valve is also reduced, whereupon the hydraulic fluid drained to the reservoir through the unloading circuit is gradually throttled to raise the delivery pressure of the hydraulic pump. When the pump delivery pressure becomes higher than the load pressure of the actuator, part of the hydraulic fluid delivered from the hydraulic pump is drained to the reservoir through the unloading circuit while the remaining hydraulic fluid is supplied to the actuator. When the logic valve is fully closed, all of the hydraulic fluid delivered from the hydraulic pump is supplied to the actuator.

Thus, with the present invention, an equivalent function to that obtained in the bleed control using an open center directional control valve can be obtained by using the closed center directional control valve, and that function can be achieved without using a controller.

Since the throttle and cutoff means in a combination of the logic valve and the pilot variable throttle is used, even the case of developing an equivalent function to that obtained by open center directional control valves in a hydraulic circuit including a plurality of actuators can be easily coped with by connecting a plurality of pilot variable throttles in series without using a controller.

Further, since the directional control valve is itself a closed center valve while developing an equivalent function to that obtained by an open center directional control valve, it is possible to shorten the overall length of a spool of the directional control valve to such an extent as corresponding to no need of a bypass port, improve the machining accuracy, and make a housing of the directional control valve more compact.

(2) In the above (1), the logic valve of the throttle and cutoff means comprises, for example, a valve body and a feedback slit formed in the valve body so as to change an opening area thereof depending on an amount by which the valve body is moved, the feedback slit being connected to said pilot circuit such that the pilot flow in the pilot circuit passes the feedback slit.

With that construction of causing the pilot flow to pass the feedback slit of the logic valve, the opening of the logic valve is controlled to increase and decrease depending on an increase and decrease in the rate of the pilot flow.

(3) In the above (1), preferably, the operation interlock means reduces the opening of the pilot variable throttle as the operation amount of the directional control valve increases.

With that feature, as the operation amount of the directional control valve increases, the opening of the pilot variable throttle is reduced and the rate of the pilot flow passing the feedback slit of the logic valve is controlled to decrease.

(4) In the above (1), preferably, the hydraulic drive system further comprises a pilot valve for outputting a pilot pressure as an operation signal and driving the directional control valve, and the operation interlock means comprises means for introducing the same pilot pressure as output from the pilot valve to the directional control valve and the pilot variable throttle of the throttle and cutoff means.

By constructing the directional control valve and the pilot variable throttle of the throttle and cutoff means to be of the hydraulic pilot type, the directional control valve and the pilot variable throttle can be easily operated in an interlock manner.

(5) In the above (1), preferably, the actuator and the directional control valve are each provided in plural number, and the pilot variable throttle of the throttle and cutoff means is provided in plural number corresponding to the plurality of directional control valves, the plurality of pilot variable throttles being connected in series.

With that feature, an equivalent function to that obtained by an open center directional control valve can be achieved, as stated in the above (1), for each of combinations of the directional control valves and the pilot variable throttles. In addition, an equivalent function to that obtained by a conventional multiple open center directional control valve can be realized.

(6) In the above (1), preferably, flow rate detecting means for detecting the rate of the pilot flow is disposed between the pilot variable throttle of the throttle and cutoff means and said reservoir, a delivery rate of the hydraulic pump being regulated by using a signal generated by the flow rate detecting means.

With that feature, an equivalent function to that obtained by the conventional open center directional control valve can be achieved. In addition, since the pilot flow passes the flow detecting means at a small rate, the flow rate detecting means can be reduced in size and improved in reliability.

(7) In the above (1), preferably, a relief valve is disposed in parallel to the pilot variable throttle of the throttle and cutoff means.

By providing the relief valve to release the pilot flow instead of a conventional large-sized relief valve which has been used to release a large flow rate supplied from the hydraulic pump, the relief valve can be reduced in size and the construction of the hydraulic drive system can be further simplified.

(8) Also, to achieve the above first object, according to the present invention, in a directional control valve apparatus comprising a valve housing, a main spool slidably disposed in the housing and communicating a feeder port connected to a hydraulic pump with load ports connected to an actuator, an unloading circuit interconnecting the feeder port and a reservoir port connected to a reservoir, and throttle and cutoff means installed in the unloading circuit for throttling and cutting off the unloading circuit depending on an amount by which the main spool is operated, the throttle and cutoff means comprises a logic valve including a feedback slit of which opening area is changed depending on an amount by which a valve body is moved, a sub-spool including a pilot variable throttle to control a rate of a pilot flow passing the feedback slit for reducing an opening of the pilot variable throttle as the sub-spool displaces from a neutral position, and operation interlock means for displacing the sub-spool depending on the operation amount of the main spool.

In the present invention thus constructed, when the main spool is operated, the sub-spool is displaced by the operation interlock means to reduce the opening of the pilot variable throttle, whereupon the rate of the pilot flow passing the feedback slit of the logic valve is reduced and the opening of the logic valve is also reduced. Accordingly, as stated in the above (1), part of the hydraulic fluid delivered from the hydraulic pump is drained to the reservoir through the unloading circuit while the remaining hydraulic fluid is supplied to the actuator. Thus, an equivalent function to that obtained by an open center directional control valve can be achieved without using a controller.

Further, as stated in the above (1), even the case of employing a hydraulic circuit including a plurality of actuators can be easily coped with, and an improvement in machining accuracy and a more compact structure can be realized.

(9) In the above (8), preferably, the operation interlock means comprises means for communicating pilot pressure bearing chambers defined at both ends of the main spool respectively with pilot pressure bearing chambers defined at both ends of the sub-spool.

With that feature, the directional control valve and the pilot variable throttle can be easily operated in an interlock manner by using the same pilot pressure.

(10) In the above (8), preferably, the main spool and the sub-spool are arranged in the housing parallel to each other.

With that feature, opposite ends of the main spool and the sub-spool are positioned to face the same opposite housing surfaces so that the operation interlock means can be mounted to each of those housing surfaces and the interlock structure for both the spools can be more easily realized.

(11) In the above (8), preferably, the directional control valve apparatus further comprises a load check valve disposed in an inlet portion of the main spool for preventing a hydraulic fluid from flowing backward from the load ports to the feeder port, the sub-spool being arranged parallel to the main spool on the side opposite to the load check valve with the main spool positioned therebetween.

With that feature, when installing the sub-spool, the sub-spool can be rationally arranged in a free space inside the housing without causing interference with the load check valve. In addition, as stated in the above (10), the operation interlock means for the main spool and the sub-spool can be easily constructed.

(12) To achieve the above second object, according to the present invention, in the above (8), the valve apparatus is constructed as a multiple valve including a plurality of main spools arranged side by side, and corresponding plural sets of combination of the main spools and sub-spools are installed in the valve housing, the plurality of sub-spools being connected in series.

With that feature, as stated in the above (4), an equivalent function to that obtained by an open center directional control valve can be achieved for each of combinations of the main spools and the sub-spools, and in addition an equivalent function to that obtained by a conventional multiple open center directional control valve can be realized.

Further, in the valve apparatus constructed as a multiple valve including a plurality of main spools arranged side by side, a weight reduction of the housing to such an extent as corresponding to no need of a bypass port can be achieved in proportion to the number of the main spools. Accordingly, the housing can be greatly reduced in weight and size and the manufacture cost can be considerably cut down.

(13) In the above (8), preferably, flow rate detecting means for detecting the rate of the pilot flow is disposed between the sub-spool and the reservoir port, a delivery rate of the hydraulic pump being regulated by using a signal generated by the flow rate detecting means.

With that feature, as stated in the above (5), the flow rate detecting means can be reduced in size and improved in reliability.

(14) In the above (8), a relief valve is disposed in parallel to the sub-spool.

With that feature, as stated in the above (6), the relief valve can be reduced in size and the construction of the hydraulic drive system can be further simplified.

BEST MODE FOR CARRYING OUT THE INVENTION

Hereunder, embodiments of the present invention will be described with reference to the drawings .

To begin with, a first embodiment of the present invention will be described with reference to FIGS. 1–3.

Figure 1:
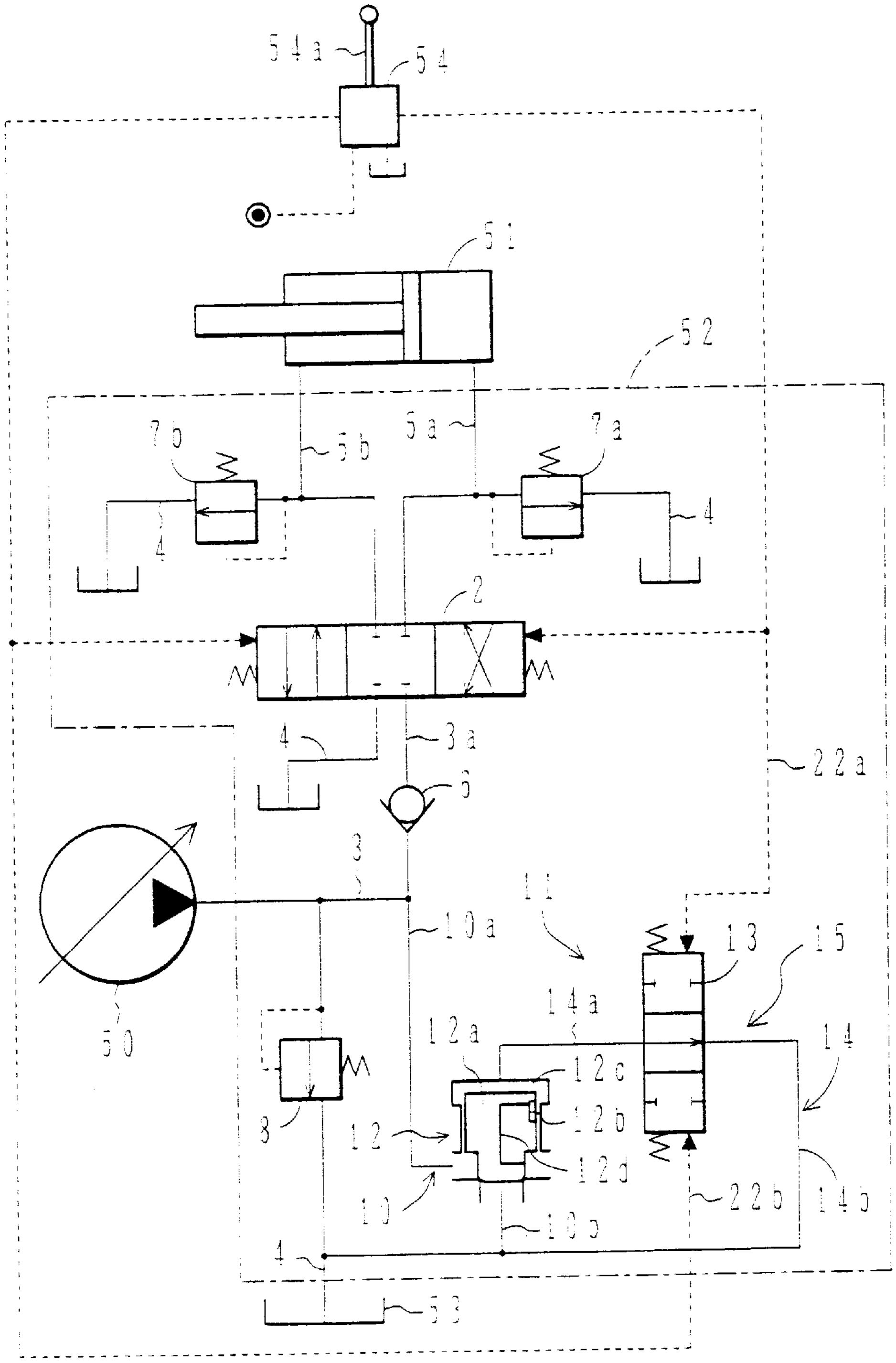
FIG. 1 is a hydraulic circuit diagram of a hydraulic drive system and a directional control valve apparatus according to a first embodiment of the present invention.

In FIG. 1, a hydraulic drive system of this embodiment comprises a hydraulic pump 50, a hydraulic actuator 51 driven by a hydraulic fluid delivered from the hydraulic pump 50, a directional control valve apparatus 52 for controlling a flow of the hydraulic fluid supplied from the hydraulic pump 50 to the actuator 51, and a reservoir 53.

The directional control valve apparatus 52 comprises a main spool 2 constituting a closed center directional control valve, a feeder port 3 and an inlet port 3*a* both connected to the hydraulic pump and constituting a hydraulic supply line, a reservoir port 4 connected to the reservoir 53, load ports 5*a*, 5*b* connected to the actuator, a load check valve 6 for preventing the hydraulic fluid from flowing backward from the load ports 5*a*, 5*b* to the feeder port 3, overload relief valves 7*a*, 7*b* connected respectively to the load ports 5*a*, 5*b*, and a main relief valve 8 for limiting a maximum pressure in the circuit. Note that although the reservoir port 4 associated with the main spool 2 and the reservoir ports 4 associated with the overload relief valves 7*a*, 7*b* are shown separately from the reservoir port 4 downstream of the main relief valve 8 and correspondingly the reservoirs are also shown separately from the reservoir 53 downstream of the main relief valve 8 in FIG. 1 for convenience of illustration, those reservoir ports and reservoirs are in fact formed respectively as a single reservoir port and a single reservoir.

The main spool 2 communicates the feeder port 3 with the load port 5*a* or 5*b* and the load port 5*b* or 5*a* with the reservoir port 4 depending on the direction in which it is operated. Also, the main spool 2 is provided with meter-in and meter-out variable throttles (described later) so that the flow rate of the hydraulic fluid flowing from the feeder port 3 to the load port 5*a* or 5*b* and the flow rate of the hydraulic fluid flowing from the load port 5*a* or 5*b* to the reservoir port 4 are controlled depending on the displacement (stroke) of the main spool 2.

In this embodiment, the main spool 2 is operated by using a pilot pressure given as an output of a pilot valve 54, and when a control lever 54*a* of the pilot valve 54 is operated, the output pressure of the pilot valve 54 is applied to a corresponding end of the main spool 2 for shifting the main spool 2.

The directional control valve apparatus 52 further includes an unloading circuit 10 interconnecting the feeder port 3 and the reservoir port 4. The unloading circuit 10 comprises a passage 10*a* as part of the feeder port 3 and a passage 10*b* connected to the reservoir port 4. Between the passages 10*a* and 10*b*, there is provided throttle and cutoff means 11 for throttling and cutting off the unloading circuit 10 depending on an amount (stroke) by which the main spool 2 is operated.

In this embodiment, the throttle and cutoff means 11 is made up of a logic valve 12 and a pilot circuit 15 having a sub-spool 13.

The logic valve 12 has a valve body 12*a* of the seat valve type for opening and closing the unloading circuit. The valve body 12*a* is provided with a feedback slit 12*b* whose opening area increases and decreases depending on an amount by which the valve body 12*a* is moved. An end of the valve body 12*a* opposite to an outlet of the logic valve 12 (the passage 10*b*) is positioned to face a back pressure chamber 12*c*, and an inlet of the logic valve 12 (the passage 10*a*) is communicated with the back pressure chamber 12*c* through both a passage 12*d* formed in the valve body 12*a* and the feedback slit 12*b*.

The pilot circuit 15 has a pilot passage 14 and the sub-spool 13 is disposed between passage portions 14*a* and 14*b* of the pilot passage 14. The passage portion 14*a* of the pilot passage 14 is connected to the back pressure chamber 12*c*, and the passage portion 14*b* of the pilot passage 14 is connected to the reservoir port 4. The same output pressure of the pilot valve 54 (pilot pressure) as applied to the main spool 2 is also applied to both ends of the sub-spool 13 through passages 22*a*, 22*b* serving as operation interlock means. The pilot pressure acts to move the sub-spool 13 depending on the operation amount of the main spool 2 to change openings (opening areas) of pilot variable throttles 13*a*, 13*b* (see FIG. 2, described later) provided in the sub-spool 13. Stated otherwise, when the sub-spool 13 is in a neutral position as shown, the pilot variable throttles each have a maximum opening, and when the sub-spool 13 is moved in either direction from the neutral position as shown, the opening of the pilot variable throttle is reduced depending on the amount of movement of the sub-spool 13.

In accordance with change in opening of the pilot variable throttle of the sub-spool 13, a pilot flow passing the feedback slit 12*b* of the logic valve 12 is changed and the opening area of the logic valve 12 in communication with the reservoir port 4 is controlled. After passing the feedback slit 12*b* of the logic valve 12, the pilot flow is drained to the reservoir port 4 through the back pressure chamber 12*c*, the pilot passage 14*a*, the pilot variable throttle provided in the sub-spool 13, and the pilot passage 14*b*. By throttling the opening of the pilot variable throttle to restrict a rate of the pilot flow, the pressure in the back pressure chamber 12*c* of the logic valve 12 is raised, whereupon the valve body 12*a* of the logic valve 12 is moved downward on the drawing to restrict an opening of the logic valve 12 (an opening amount of the unloading circuit 10). When the pilot variable throttle of the sub-spool 13 is brought into a closed state, the logic valve 12 is substantially closed and the unloading circuit 10 is closed.

It is to be noted that the above-stated operation of the logic valve 12 and the sub-spool 13 is known from JP, A, 6-193604.

Figure 2:
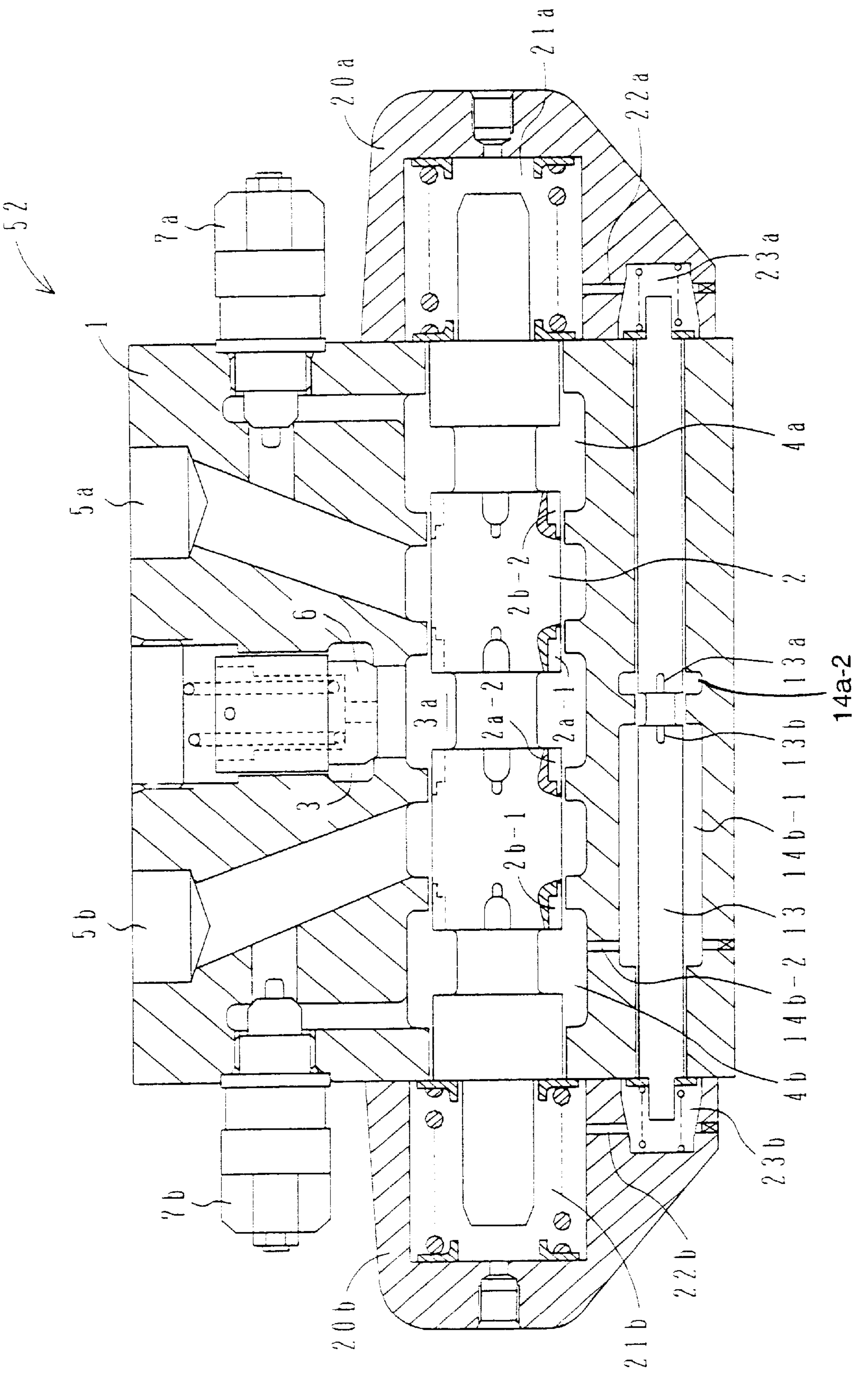
FIG. 2 is a sectional view of a directional control valve apparatus, shown in FIG. 1, sectioned along a plane including a main spool and a sub-spool.
Figure 3:
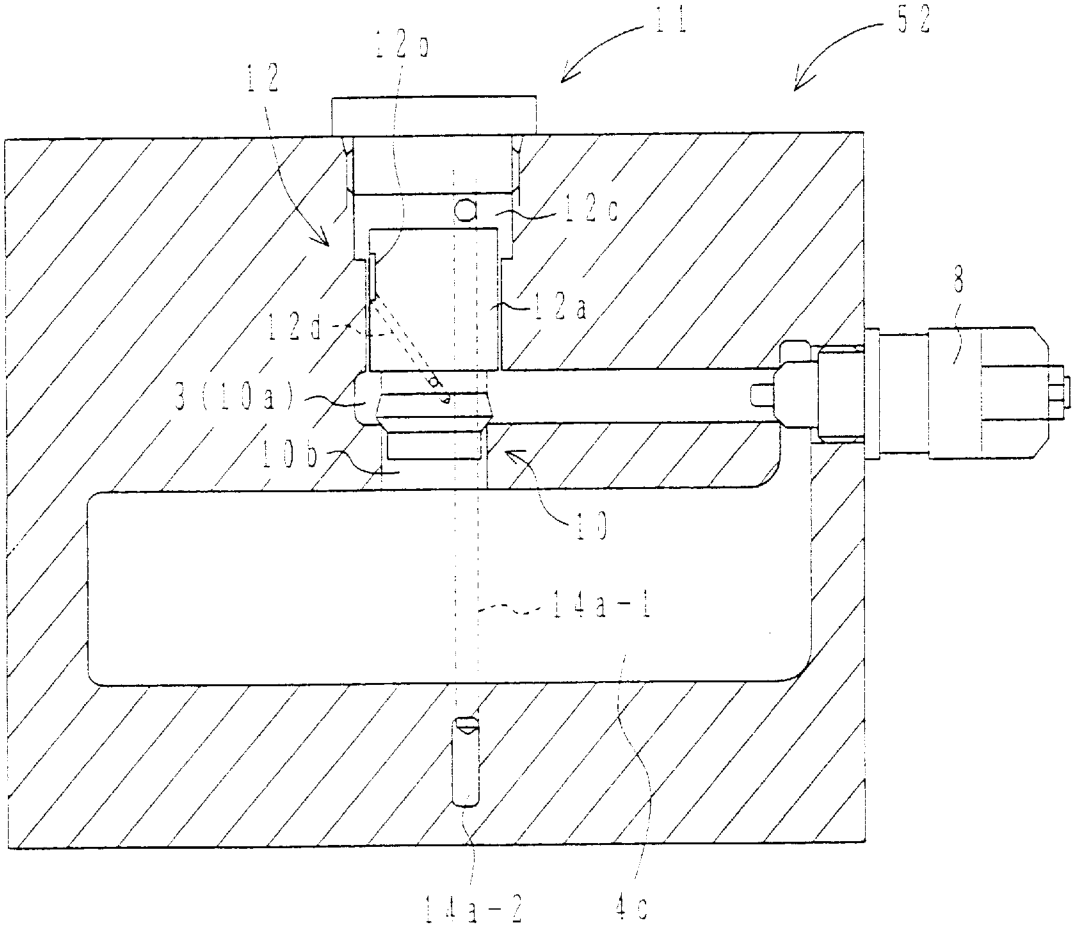
FIG. 3 is a sectional view of the directional control valve apparatus, shown in FIG. 1, sectioned along a plane including a valve body of a logic valve.

One example of the structure of the directional control valve apparatus 52 is shown in FIGS. 2 and 3.

FIG. 2 shows a section of the directional control valve apparatus 52 sectioned along a plane passing the axes of the main spool 2 and the sub-spool 13. The main spool 2 and the sub-spool 13 are slidably fitted in a housing 1. The housing 1 has formed therein the feeder port 3 connected to the hydraulic pump 50 (see FIG. 1), the load ports 5*a*, 5*b* connected to the actuator 51 (see FIG. 1), and reservoir ports 4*a*, 4*b* through which the return hydraulic fluid from the load ports 5*a*, 5*b* are drained upon the operation of the main spool 2. A load check valve 6 is disposed between the feeder port 3 and the inlet port 3*a*, and the overload relief valves 7*a*, 7*b* are disposed respectively in the load ports 5*a*, 5*b*. The feeder port 3 is extended in a direction perpendicular to the drawing sheet.

The main spool 2 is provided with meter-in variable throttles (notches) 2*a*-1, 2*a*-2 and meter-out variable throttles (notches) 2*b*-1, 2*b*-2 formed as shown. When the main spool 2 is moved to the right on the drawing, the hydraulic fluid in the feeder port 3 pushes up the load check valve 6 and flows into the inlet port 3*a*. From the inlet port 3*a*, the hydraulic fluid flows into the load port 5*a* through the meter-in variable throttle 2*a*-1 and is then supplied to the actuator 51 (see FIG. 1). The return hydraulic fluid from the actuator 51 flows from the load port 5*b* into the reservoir port 4*b* through the meter-out variable throttle 2*b*-1 and is then returned to the reservoir 53 (see FIG. 1). The above explanation is also equally applied to when the main spool 2 is moved to the left on the drawing. In this case, however, the hydraulic fluid from the inlet port 3*a* is supplied to the actuator 51 (see FIG. 1) through the meter-in variable throttle 2*a*-2 and the return hydraulic fluid from the actuator 51 is returned to the reservoir 53 (see FIG. 1) through the meter-out variable throttle 2*b*-2 and the reservoir port 4*a*.

The sub-spool 13 is provided with the pilot variable throttles (notches) 13*a*, 13*b* formed in a central portion thereof. The variable throttle 13*a* is positioned at one end of a pilot passage 14*a*-2 extended in the direction perpendicular to the drawing sheet, and the variable throttle 13*b* is positioned at one end of a pilot passage 14*b*-1 formed along an outer periphery of the sub-spool 13, the other end of the pilot passage 14*b*-1 being connected to the reservoir port 4*b* through a pilot passage 14*b*-2.

The main spool 2 and the sub-spool 13 are fitted to extend parallel to each other. The output pressure of the pilot valve 54 (see FIG. 1) is introduced to one of main pressure bearing chambers 21*a*, 21*b* defined in pilot caps 20*a*, 20*b* for being applied to the main spool 2, and at the same time introduced to one of sub-pressure bearing chambers 23*a*, 23*b* through passages 22*a*, 22*b* provided in the pilot caps 20*a*, 20*b* for being applied to the sub-spool 13.

FIG. 3 is a sectional view sectioned along a plane passing the logic valve 12. A portion of the feeder port 3 is extended as the passage 10*a* to the inlet of the logic valve 12 of the throttle and cutoff means 11, and the valve body 12*a* of the logic valve 12 is positioned between the passage 10*a* and the passage 10*b* communicating with a reservoir port 4*c*. The valve body 12*a* has the feedback slit 12*b* and the passage 12*d*. An end of the valve body 12*a* opposite to the passage 10*b* is positioned to face the back pressure chamber 12*c* which is connected to the pilot passage 14*a*-2 through a pilot passage 14*a*-1.

The pilot passages 14*a*-1, 14*a*-2 correspond to the passage portion 14*a* of the pilot passage 14 shown in FIG. 1, and the pilot passages 14*b*-1, 14*b*-2 correspond to the passage portion 14*b* of the pilot passage 14 shown in FIG. 1. Moreover, the reservoir ports 4*a*, 4*b*, 4*c* are all connected to the reservoir port 4 shown in FIG. 1.

As explained above, when the opening of the pilot variable throttle 13*a*, 13*b* of the sub-spool 13 shown in FIG. 2 is changed, the pilot flow passing the feedback slit 12*b* of the logic valve 12 shown in FIG. 3 is changed and the position of the valve body 10*a* of the logic valve 12 in the vertical direction on the drawing is changed and hence the opening of the logic valve 12, i.e., the opening amount of the unloading circuit 10, is controlled.

After passing the feedback slit 12*b* of the logic valve 12 shown in FIG. 3, the pilot flow is drained to the reservoir port 4*b* through the back pressure chamber 12*c*, the pilot passages 14*a*-1 and 14*a*-2 (14*a*), the pilot variable throttle 13*a* or 13*b* provided in the sub-spool 13, and the pilot passages 14*b*-1 and 14*b*-2 (14*b*).

When the sub-spool 13 is operated to reduce the opening of the pilot variable throttle 13*a* or 13*b*, the pilot flow is restricted and the pressure in the back pressure chamber 12*c* of the logic valve 12 is raised, whereupon the valve body 12*a* of the logic valve 12 is moved downward on the drawing to restrict the opening amount of the unloading circuit 10. When the pilot variable throttle 13*a* or 13*b* of the sub-spool 13 is brought into a closed state, the unloading circuit 10 is substantially closed.

Further, in FIG. 3, the relief valve 8 is disposed between the feeder port 3 and the reservoir port 4*c*.

In this embodiment thus constructed, when the control lever 54*a* of the pilot valve 54 is not operated, the meter-in variable throttles 2*a*-1 and 2*a*-2 of the main spool 2 of the directional control valve are closed, the pilot variable throttles 13*a* and 13*b* of the sub-spool 13 are opened at a maximum opening, and the valve body 12*a* of the logic valve 12 is in a maximum opening position. Therefore, all of the hydraulic fluid delivered from the hydraulic pump 50 flows into the reservoir 53 through the logic valve 12 and the reservoir port 4.

When the operator manipulates the control lever 54*a* of the pilot valve 54 in the above condition, the pilot pressure is produced depending on the direction and amount in and by which the control lever 54*a* is operated, and applied to the main spool 2 of the directional control valve. At the same time, the pilot pressure is also applied to the sub-spool 13 of the throttle and cutoff means 11. Accordingly, the meter-in variable throttle 2*a*-1 or 2*a*-2 of the main spool 2 is opened and the opening of the pilot variable throttle 13*a* or 13*b* of the sub-spool 13 is reduced such that the main spool 2 and the sub-spool 13 are operated to provide respective openings corresponding to the same pilot pressure. Thus, the opening of the logic valve 12 is reduced and as the output pressure of the pilot valve 54 rises, the hydraulic fluid drained to the reservoir 53 from the hydraulic pump 50 is gradually throttled to raise the delivery pressure of the hydraulic pump 50. When the pump delivery pressure becomes higher than the load pressure of the actuator 51, part of the hydraulic fluid delivered from the hydraulic pump 50 is supplied to the actuator 51 through the meter-in variable throttle 2*a*-1 or 2*a*-2 of the main spool 2. As the opening of the logic valve 12 reduces, the flow rate supplied to the actuator 51 is increased. When the pilot variable throttle 13*a* or 13*b* of the sub-spool 13 is fully closed and the logic valve 12 is also fully closed, all of the hydraulic fluid delivered from the hydraulic pump 50 is supplied to the actuator 51.

With this embodiment, therefore, an equivalent function to that obtained by the open center directional control valve can be achieved by using the closed center directional control valve (the main spool 2) and good operability is resulted. Further, that function can be realized without using a controller.

Since a bleed valve of the unloading circuit 10 is constituted by the throttle and cutoff means 11 in a combination of the logic valve 12 and the sub-spool 13, even the case of developing an equivalent function to that obtained by the open center directional control valves in a hydraulic circuit including a plurality of actuators can be easily coped with, as will be apparent from an embodiment described later, by connecting a plurality of sub-spools 13 in series without using a controller.

Also, since the directional control valve is itself a closed center valve while developing an equivalent function to that obtained by the conventional open center directional control valve, it is possible to improve the problems attributable to the open center directional control valve (i.e., such problems that the main spool has an increased overall length, thus raising a difficulty in machining the main spool with high accuracy, and that the housing 1 has an increased length in its portion where the unloading circuit is arranged, thus increasing weight and cost of the housing and also raising a difficulty in manufacture of a molding). As a result, an improvement in machining accuracy and a more compact structure can be realized and the manufacture cost of the directional control valve apparatus can be cut down in combination with no need of a controller.

Further, since the valve apparatus can be designed to have a smaller ratio L/D of an outer diameter D to an overall length L of the main spool 2, effects caused by bending of a b ore occur red in machining of the housing and bending of the spool itself can be made smaller. As a result, the valve apparatus can be designed with a smaller clearance in design drawings than conventional, and hence an oil-tight ability, which has been a technical-problem specific to directional control valves of the spool type, can be remarkably improved. In addition, since the housing can be designed to have a smaller size and heat is more quickly propagated, it is also possible to eliminate a trouble of spool seizure that may occur by a heat shock due to thermal unbalance.

Moreover, in this embodiment, the directional control valve is of the hydraulic pilot type and both the main spool 2 and the sub-spool 13 can be easily operated in an interlock manner by using the same pilot pressure.

Especially, since the main spool 2 and the sub-spool 13 are arranged parallel to each other, opposite ends of the main spool 2 and the sub-spool 13 are positioned to face the same opposite housing surfaces so that the pilot cap 20 common to both the spools can be mounted to each of those housing surfaces and the interlock structure for both the spools can be more easily realized.

Figure 4:
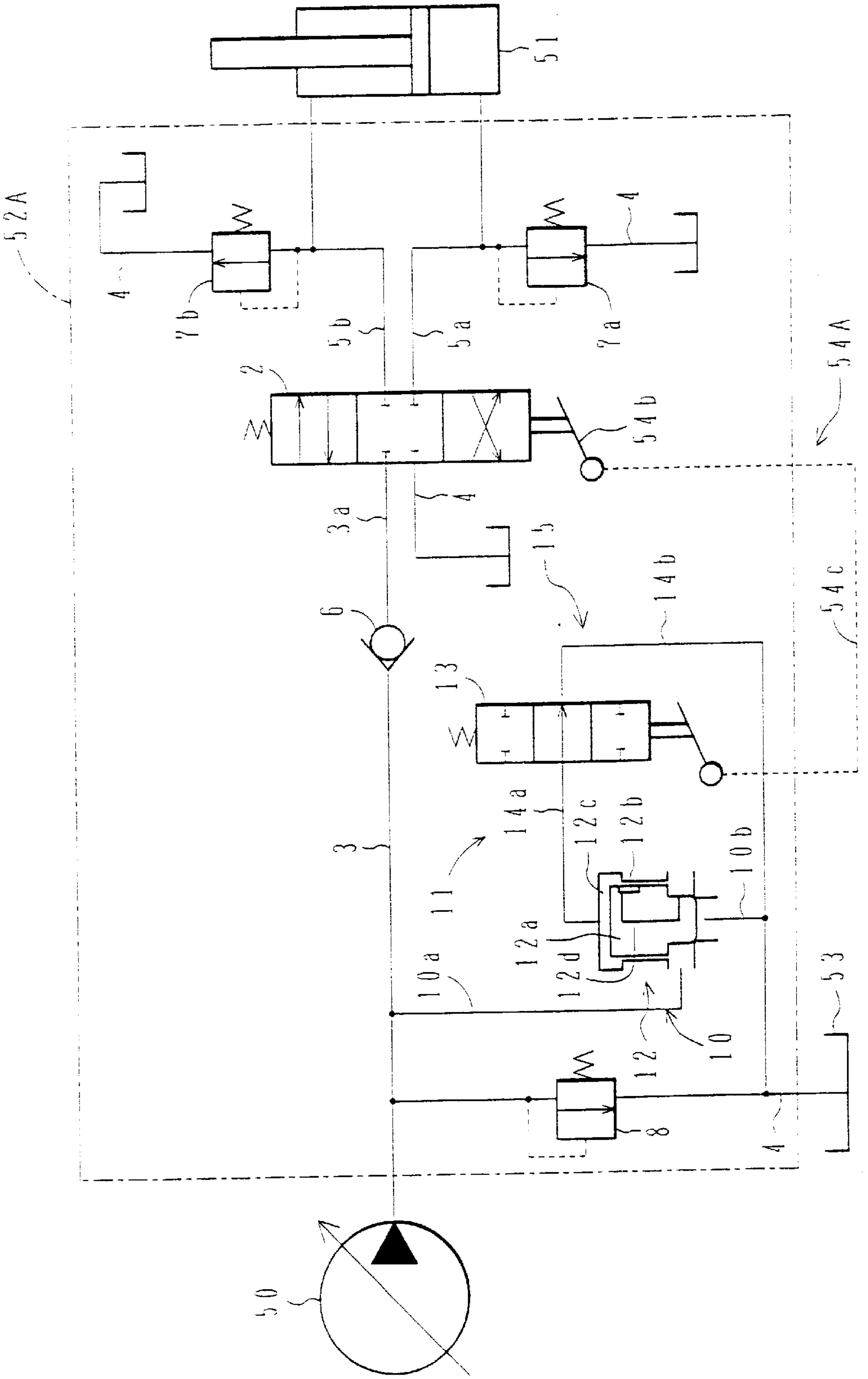
FIG. 4 is a hydraulic circuit diagram of a hydraulic drive system and a directional control valve apparatus according to a second embodiment of the present invention.

A second embodiment of the present invention will be described with reference to FIG. 4. In this embodiment, the main spool and the sub-spool are mechanically interlocked with each other. In FIG. 4, equivalent members to those shown in FIG. 1 are denoted by the same reference numerals.

Referring to FIG. 4, denoted by 52A is a directional control valve apparatus for use in a hydraulic drive system of this embodiment. The directional control valve apparatus 52A has a mechanical control lever unit 54A instead of the pilot valve 54 shown in FIG. 1. The control lever unit 54A comprises a control lever 54*b* mechanically coupled to the main spool 2 and an operation interlock mechanism 54*c* for transmitting motion of the control lever 54*b*. When the control lever 54*b* is operated, the main spool 2 is mechanically operated depending on the direction and amount in and by which the control lever 54*b* is operated, and at the same time the movement of the main spool 2 is transmitted to the sub-spool 13. Thus, the sub-spool 13 is also mechanically operated depending on the operation amount of the main spool 2.

This embodiment can also provide similar advantages as obtainable with the first embodiment.

A third embodiment of the present invention will be described with reference to FIGS. 5 to 8. This embodiment intends to realize the function of a conventional multiple directional control valve by combinations of plural main spools and plural sub-spools. In FIGS. 5 to 8, equivalent members to those shown in FIGS. 1 and 2 are denoted by the same reference numerals.

Figure 5:
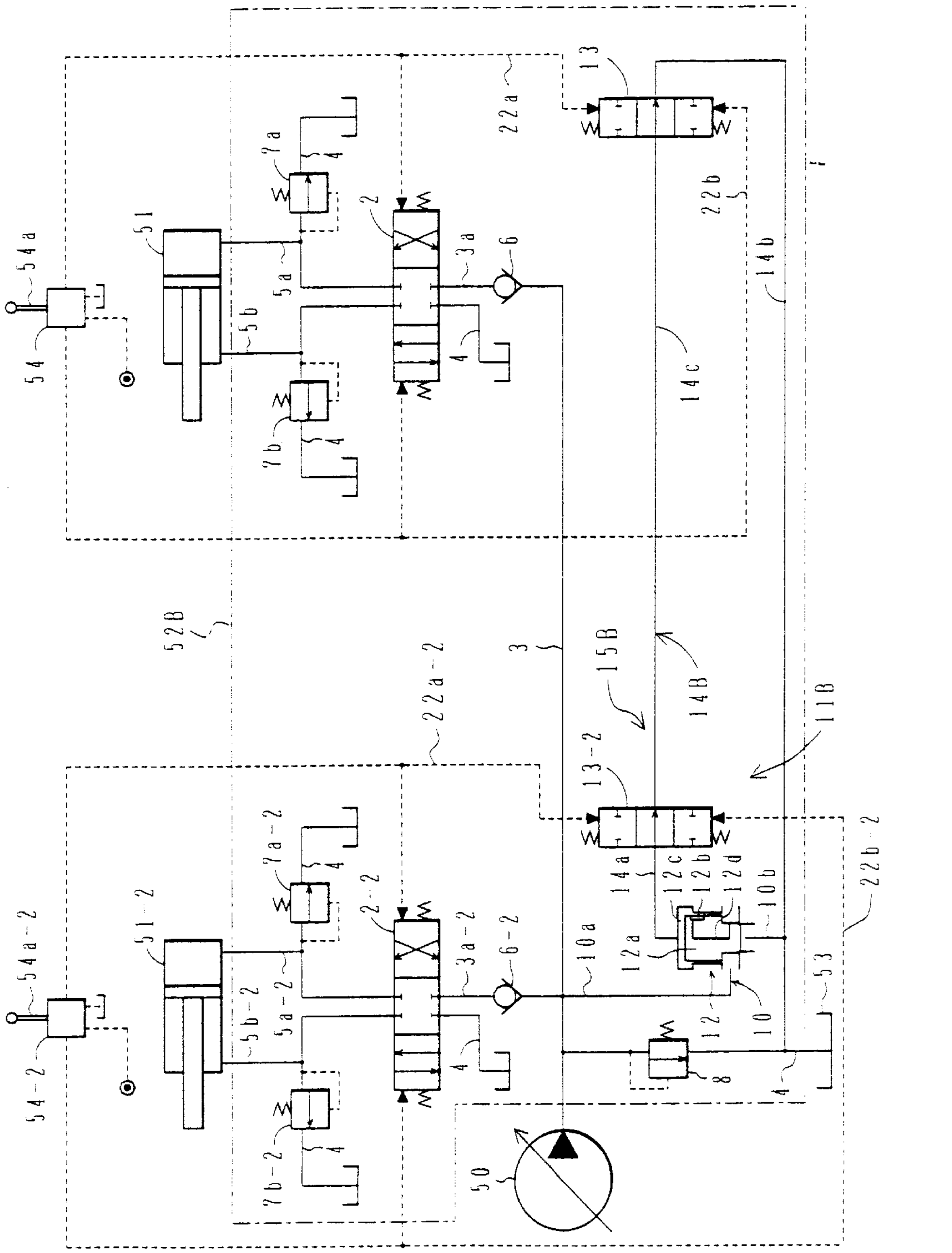
FIG. 5 is a hydraulic circuit diagram of a hydraulic drive system and a directional control valve apparatus according to a third embodiment of the present invention.

Referring to FIG. 5, a hydraulic drive system of this embodiment includes, in addition to the actuator 51, another actuator 51-2 as a hydraulic actuator driven by the hydraulic fluid delivered from the hydraulic pump 50. Correspondingly, a directional control valve apparatus 52B is constructed as follows.

The main spool 2 and a main spool 2-2 are connected in parallel to the feeder port 3 connected to the hydraulic pump 50 of the directional control valve apparatus 52B. In a pilot circuit 15B of throttle and cutoff means 11B, the sub-spool 13 operated in interlock with the main spool 2 and a sub-spool 13-2 operated in interlock with the main spool 2-2 are connected to a pilot passage 14B in series. As with the main spool 2, an inlet port 3*a*-2, load ports 5*a*-2, 5*b*-2, a load check valve 6-2, and overload relief valves 7*a*-2, 7*b*-2 are provided for the main spool 2-2.

Here, the sub-spool 13-2 is disposed between passage portions 14*a* and 14*c* of the pilot passage 14B, and the sub-spool 13 is disposed downstream of the sub-spool 13-2 between passage portions 14*c* and 14*a* of the pilot passage 14B. The same output pressure of a pilot valve 54-2 (pilot pressure) as applied to the main spool 2-2 is also applied to both ends of the sub-spool 13-2. The pilot pressure acts to move the sub-spool 13-2 depending on the operation amount of the main spool 2-2 to change openings (opening areas) of pilot variable throttles (described later) provided in the sub-spool 13-2. Stated otherwise, when the sub-spool 13-2 is in a neutral position as shown, the pilot variable throttles each have a maximum opening, and when the sub-spool 13-2 is moved in either direction from the neutral position as shown, the opening of the pilot variable throttle is reduced depending on the amount of movement of the sub-spool 13-2.

In the above construction, when the control lever 54*a* or 54*a*-2 of one of the pilot valves 54, 54-2 is operated to shift one of the main spools 2, 2-2, the corresponding sub-spool 13, 13-2 is moved to restrict the pilot flow and raise the pressure in the back pressure chamber 12*c* of the logic valve 12, whereupon the valve body 12*a* of the logic valve 12 is moved downward on the drawing to restrict the opening of the logic valve 12 (the opening amount of the unloading circuit 10). When the pilot variable throttle of the sub-spool 13 or 13-2 is brought into a closed state, the logic valve 12 is substantially closed and the unloading circuit 10 is closed.

Also, when both the control levers 54*a*, 54*a*-2 of the pilot valves 54, 54-2 are half-operated to operate the main spools 2, 2-2, the sub-spools 13, 13-2 are also operated correspondingly. At this time, because of the control levers 54*a*, 54*a*-2 being half-operated, the sub-spools 13, 13-2 are each likewise half-operated to restrict the pilot flow in accordance with the opening of the pilot variable throttle corresponding to the amount of movement of the sub-spool, thereby restricting the opening of the logic valve 12 (the opening amount of the unloading circuit 10). The above operation is equivalent to the operation obtained, in a system in which bypass ports of a plurality of open center directional control valves are connected in series, from the presence of the bypass ports when half-operating directional control valves. Thus, even when both the actuators 51, 51-2 are driven for the combined operation, equivalent control to that obtained in the bleed control using the open center directional control valves can be made by using the closed center directional control valves (the main spool 2-2).

One example of the structure of the directional control valve apparatus 52B will be described with reference to FIGS. 6 to 8, as well as FIGS. 2 and 3 in connection with the first embodiment.

The structure of portions relating to the main spool 2 and the sub-spool 13 of the directional control valve apparatus 52B is essentially the same as that in the first embodiment explained above with reference to FIG. 2. However, the pilot passage 14_a_-2 in FIG. 2 is replaced by a pilot passage 14_a_-3 described later.

Also, the structure of a portion relating to the logic valve 12 of the throttle and cutoff means 11B of the directional control valve apparatus 52B is the same as that in the first embodiment explained above with reference to FIG. 3.

Figure 6:
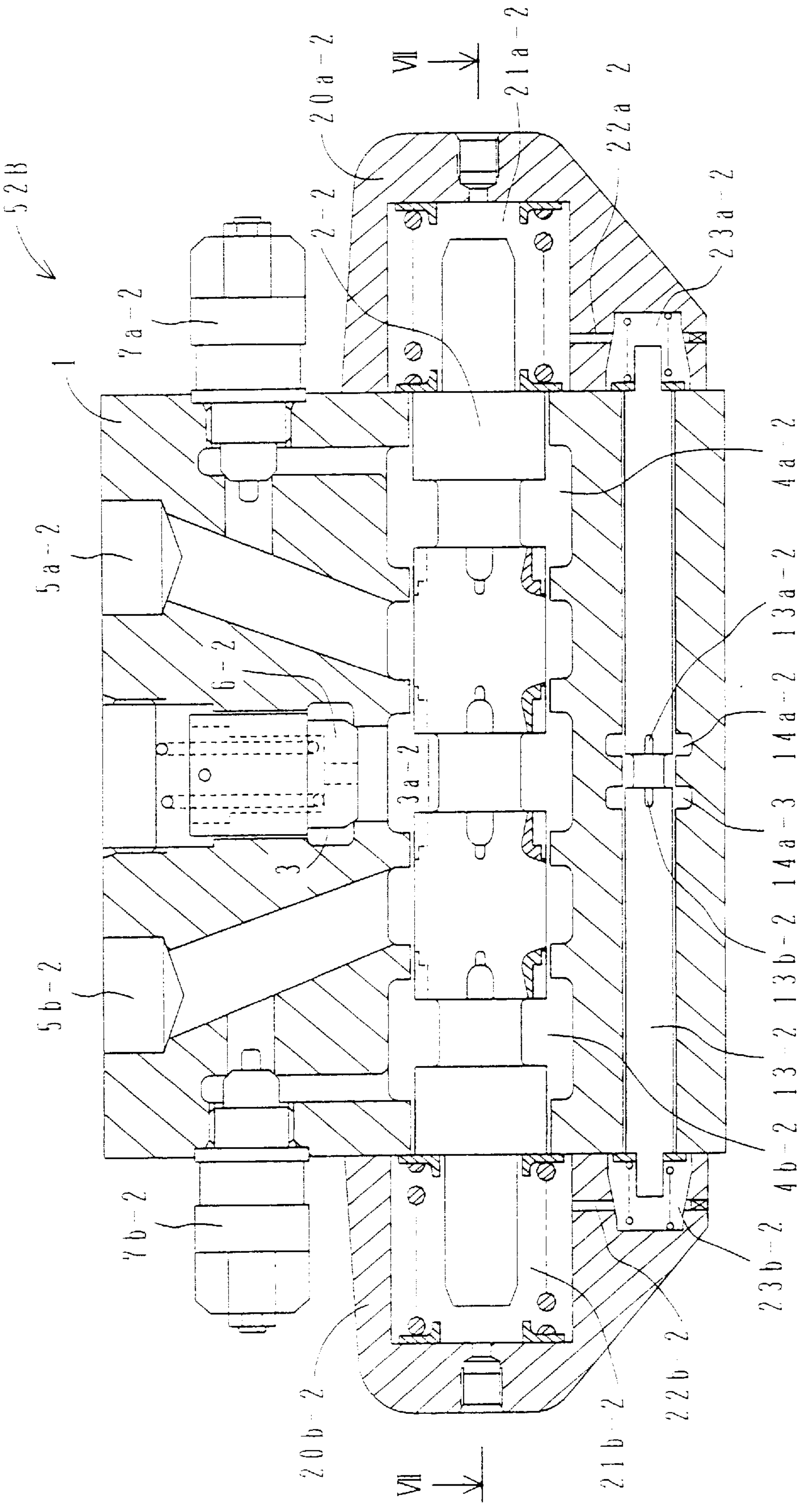
FIG. 6 is a sectional view of a directional control valve apparatus, shown in FIG. 5, sectioned along a plane including one main spool and one sub-spool.

The structure of portions relating to the main spool 2-2 and the sub-spool 13-3 of the directional control valve apparatus 52B is shown in FIG. 6.

FIG. 6 shows a section of the directional control valve apparatus 52B sectioned along a plane passing the axes of the main spool 2-2 and the sub-spool 13-2. The main spool 2-2 and the sub-spool 13-2 are slidably fitted in the housing 1. The housing 1 has formed therein the load ports 5_a_-2, 5_b_-2 connected to the actuator 51-2 (see FIG. 5) and reservoir ports 4_a_-2, 4_b_-2 through which the return hydraulic fluid from the load ports 5_a_-2, 5_b_-2 are drained upon the operation of the main spool 2-2. The load check valve 6-2 is disposed between the feeder port 3 and the inlet port 3_a_-2, and the overload relief valves 7_a_-2, 7_b_-2 are disposed respectively in the load ports 5_a_-2, 5_b_-2. The feeder port 3 is extended in a direction perpendicular to the drawing sheet and connected to the feeder port 3 shown in FIG. 2.

The structure of the main spool 2-2 is essentially the same as that of the main spool 2 in the first embodiment shown in FIG. 2.

The sub-spool 13-2 is provided with pilot variable throttles (notches) 13_a_-2, 13_b_-2 formed in a central portion thereof. The variable throttle 13_a_-2 is positioned at one end of the pilot passage 14_a_-2 extended in the direction perpendicular to the drawing sheet, and the variable throttle 13_b_-2 is positioned at one end of the pilot passage 14_a_-3.

The main spool 2-2 and the sub-spool 13-2 are fitted to extend parallel to each other. The output pressure of the pilot valve 54-2 (see FIG. 5) is introduced to one of main pressure bearing chambers 21_a_-2, 21_b_-2 defined in pilot caps 20_a_-2, 20_b_-2 for being applied to the main spool 2-2, and at the same time introduced to one of sub-pressure bearing chambers 23_a_-2, 23_b_-2 through passages 22_a_-2, 22_b_-2 provided in the pilot caps 20_a_-2, 20_b_-2 for being applied to the sub-spool 13-2.

Figure 7:
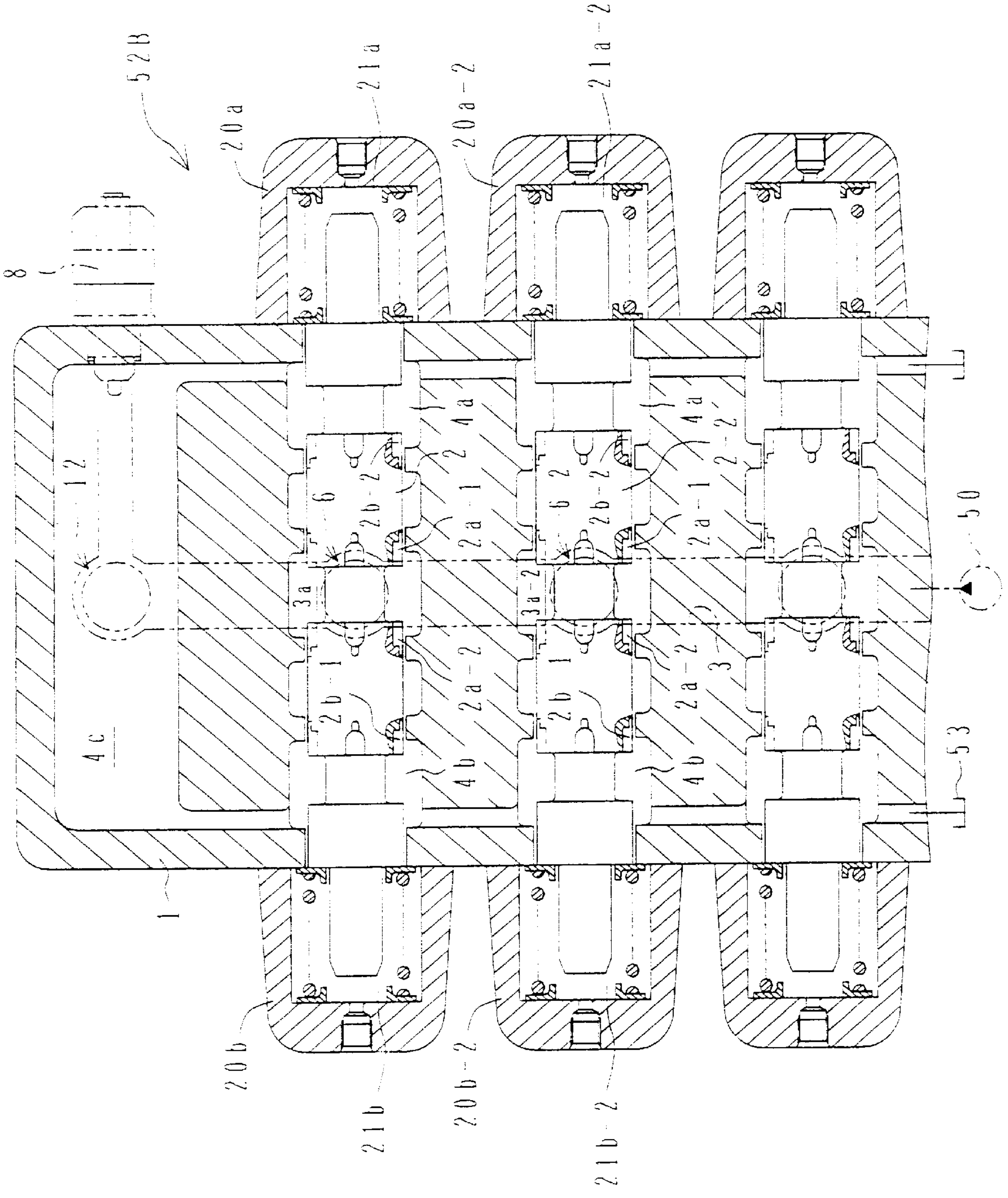
FIG. 7 is a sectional view taken along the line VII—VII in FIG. 6, the view showing the correlation of main spools in arrangement.

FIG. 7 is a sectional view taken along the line VII—VII in FIG. 6, the view showing the correlation of the main spools 2, 2-2 and the logic valve 12. The main spools 2, 2-2 are arranged in the housing 1 along with other main spools parallel to one another, thereby constructing a multiple valve. The reservoir port 4_c_ is formed in the upper side of the housing 1 on the drawing, and the logic valve 12 is positioned in the reservoir port 4_c_ above the drawing sheet, as indicated by a two-dot-chain line.

Figure 8:
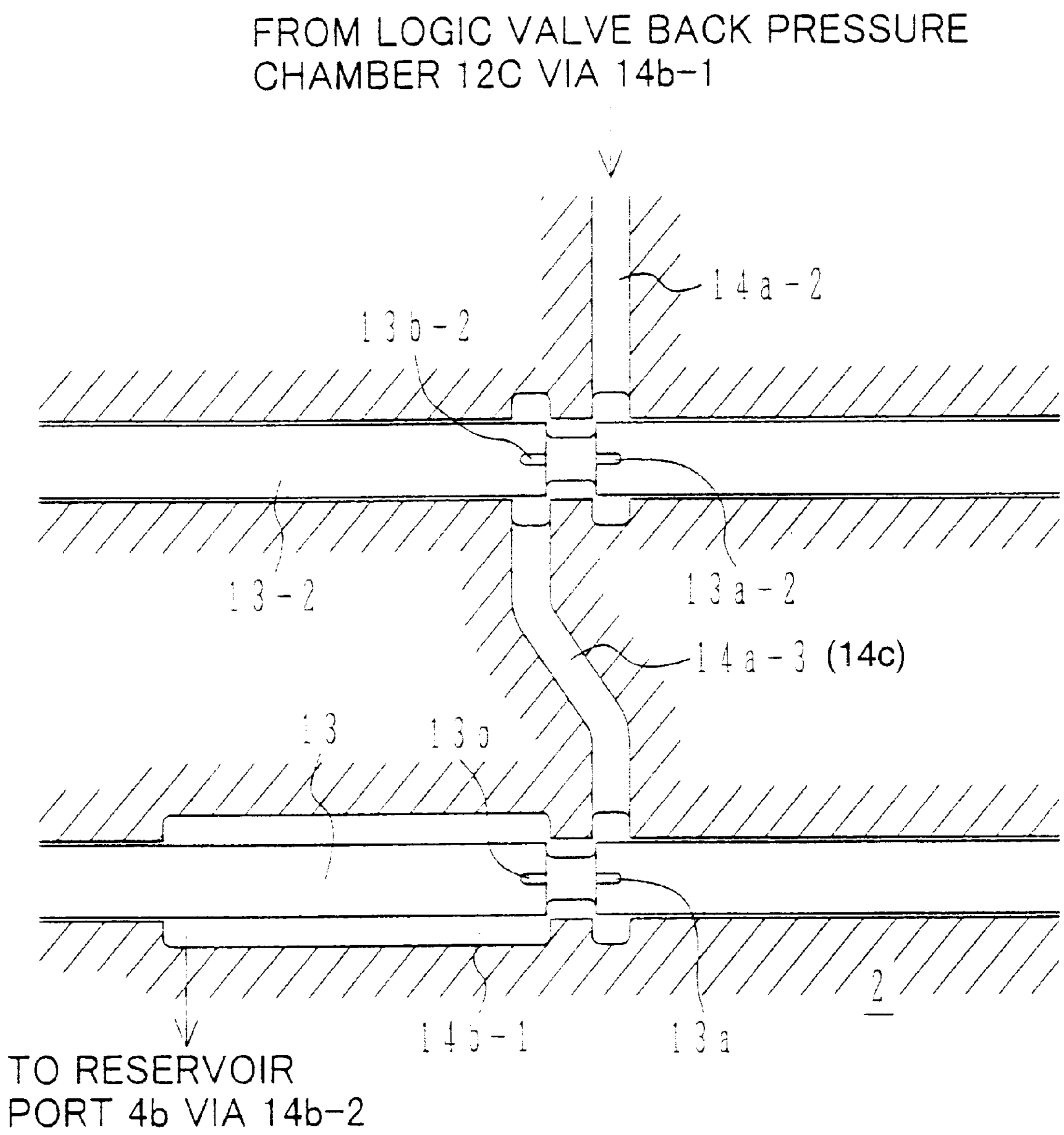
FIG. 8 is a sectional view showing the connection of pilot passages.

FIG. 8 is a view showing the correlation of the pilot passages 14_a_-2, 14_a_-3, 14_b_-1. The pilot passage 14_a_-2 is connected to the back pressure chamber 12_c_ of the logic valve 12 through the pilot passage 14_a_-1 shown in FIG. 3, and the pilot passage 14_a_-3 connects the variable throttle 13_b_-2 of the sub-spool 13-2 and the variable throttle 13_a_ of the sub-spool 13 with each other. The pilot passages 14_a_-1, 14_a_-2 correspond to the passage portion 14_a_ of the pilot passage 14B shown in FIG. 5, the pilot passage 14_a_-3 corresponds to the passage portion 14_c_ of the pilot passage 14B shown in FIG. 5, and the pilot passages 14_b_-1, 14_b_-2 correspond to the passage portion 14_b_ of the pilot passage 14B shown in FIG. 5. Moreover, the reservoir ports 4_a_, 4_b_, 4_c_, 4_a_-2, 4_b_-2 are all connected to the reservoir port 4 shown in FIG. 1.

As explained above, when one of the sub-spool 13 shown in FIG. 2 and the sub-spool 13-2 shown in FIG. 6 is operated, the pilot flow passing the feedback slit 12_b_ of the logic valve 12 shown in FIG. 3 is changed and the position of the valve body 10_a_ of the logic valve 12 in the vertical direction on the drawing is changed and hence the opening of the logic valve 12, i.e., the opening amount of the unloading circuit 10, is controlled.

After passing the feedback slit 12_b_ of the logic valve 12 shown in FIG. 3, the pilot flow is drained to the reservoir port 4_b_ through the back pressure chamber 12_c_, the pilot passages 14_a_-1 and 14_a_-2 (14_a_), the pilot variable throttle 13_a_-2 or 13_b_-2 provided in the sub-spool 13-2, the pilot passage 14_a_-3 (14_c_), the pilot variable throttle 13_a_ or 13_b_ provided in the sub-spool 13, and the pilot passages 14_b_-1 and 14_b_-2 (14_b_).

When the sub-spool 13 or 13-1 is operated to reduce the opening of one of the pilot variable throttles 13_a_, 13_b_, 13_a_-2, 13_b_-2, the pilot flow is restricted and the pressure in the back pressure chamber 12_c_ of the logic valve 12 is raised, whereupon the valve body 12_a_ of the logic valve 12 is moved downward on the drawing to restrict the opening amount of the unloading circuit 10. When the variable throttle of the sub-spool 13 or 13-2 is brought into a closed state, the unloading circuit 10 is substantially closed.

With this embodiment, as described above, the equivalent function, explained in connection with the first embodiment, to that obtained by the open center directional control valve can be achieved for each of combinations of plural main spools and plural sub-spools; hence similar advantages as obtainable with the first embodiment can be obtained. In addition, the function of a conventional multiple open center directional control valve can be realized by combinations of plural main spools and plural sub-spools.

Further, with this embodiment wherein the valve apparatus 52B is constructed as a multiple valve, the weight of the housing 1 is reduced in proportion to the number of the spools corresponding to a weight reduction of the unloading circuit for each of the conventional open center directional control valves. As a result, the housing 1 can be greatly reduced in weight and size and the manufacture cost can be considerably cut down.

Note that, by adding the combination of the main spool and the sub-spool shown in FIG. 2, the valve apparatus can be constructed to include any desired number of directional control valves.

Figure 9:
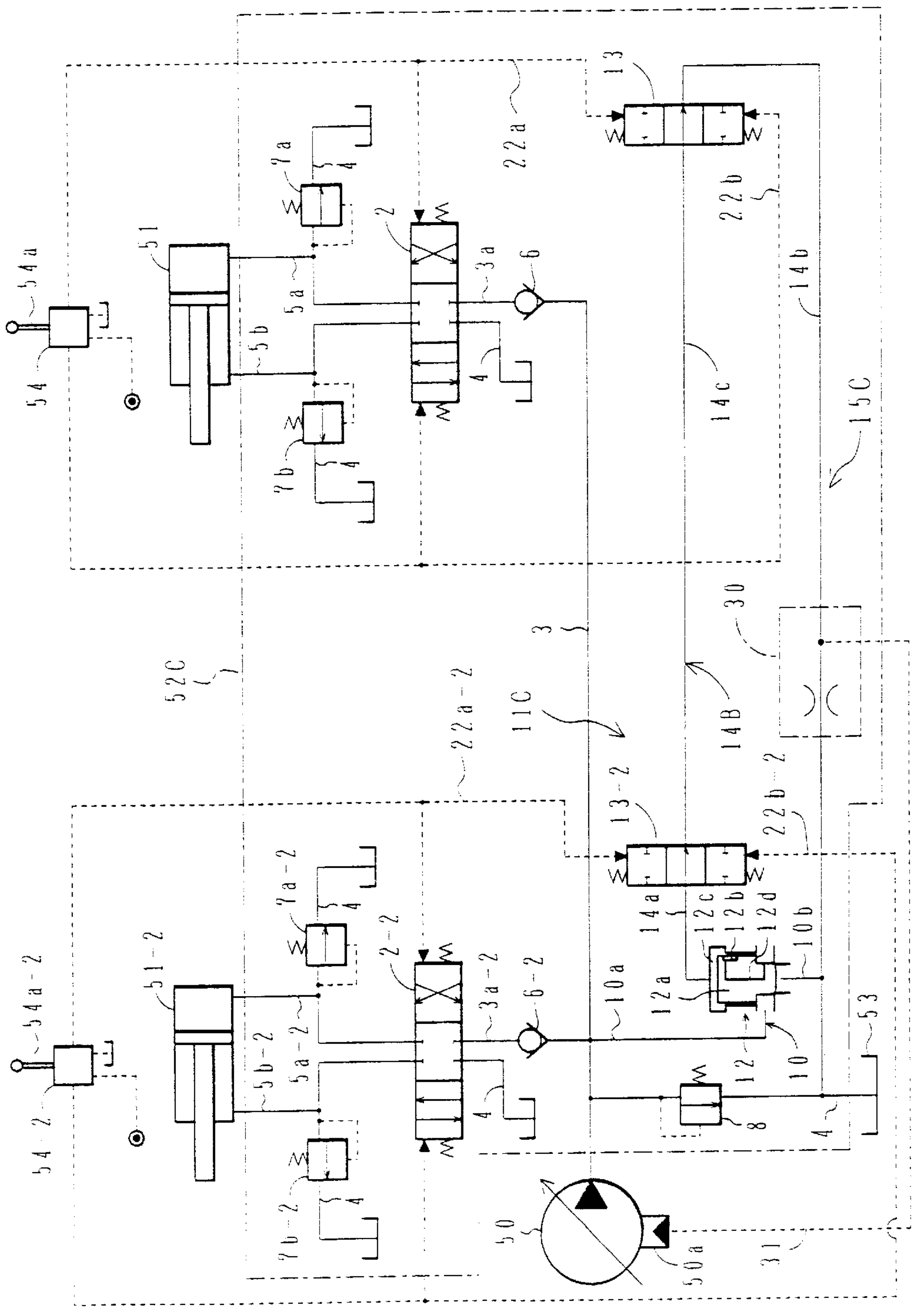
FIG. 9 is a hydraulic circuit diagram of a hydraulic drive system and a directional control valve apparatus according to a fourth embodiment of the present invention.

A fourth embodiment of the present invention will be described with reference to FIG. 9. In FIG. 9, equivalent members to those shown in FIGS. 1 and 5 are denoted by the same reference numerals.

In a conventional combination of an open center directional control valve and flow rate control for a hydraulic pump, it is general that a throttle with a relief function, for example, is provided as flow rate detecting means in an unloading circuit through which all of a hydraulic fluid delivered from a hydraulic pump passes, and the displacement of the hydraulic pump is controlled in response to a signal from the flow rate detecting means.

Such a conventional method has however had a problem that the hydraulic fluid delivered from the hydraulic pump passes the flow rate detecting means (throttle) at a full flow rate sometimes, which results in a larger size and poor reliability of the flow rate detecting means itself.

This embodiment intends to solve the above problem as well. A pilot circuit 15C of throttle and cutoff means 11C included in a directional control valve apparatus 52C shown in FIG. 9 is arranged such that flow rate detecting means, e.g., a throttle 30, for detecting a rate of the pilot flow passing the pilot passage 14B is disposed in the pilot passages 14*b* between the downstream sub-spool 13 and the reservoir port 4. A pressure signal generated by the throttle 30 is introduced to a regulator 50*a* for the hydraulic pump 50 through a signal line 31 so that the delivery rate of the hydraulic pump 50 can be adjusted.

With this embodiment thus constructed, an equivalent function to that obtained by the conventional open center directional control valve can be achieved. In addition, since the pilot flow passes the throttle 30 as the flow rate detecting means at a small rate, a relief valve which has been conventionally provided in parallel to the throttle can be dispensed with, and the flow rate detecting means can be reduced in size and improved in reliability.

Figure 10:
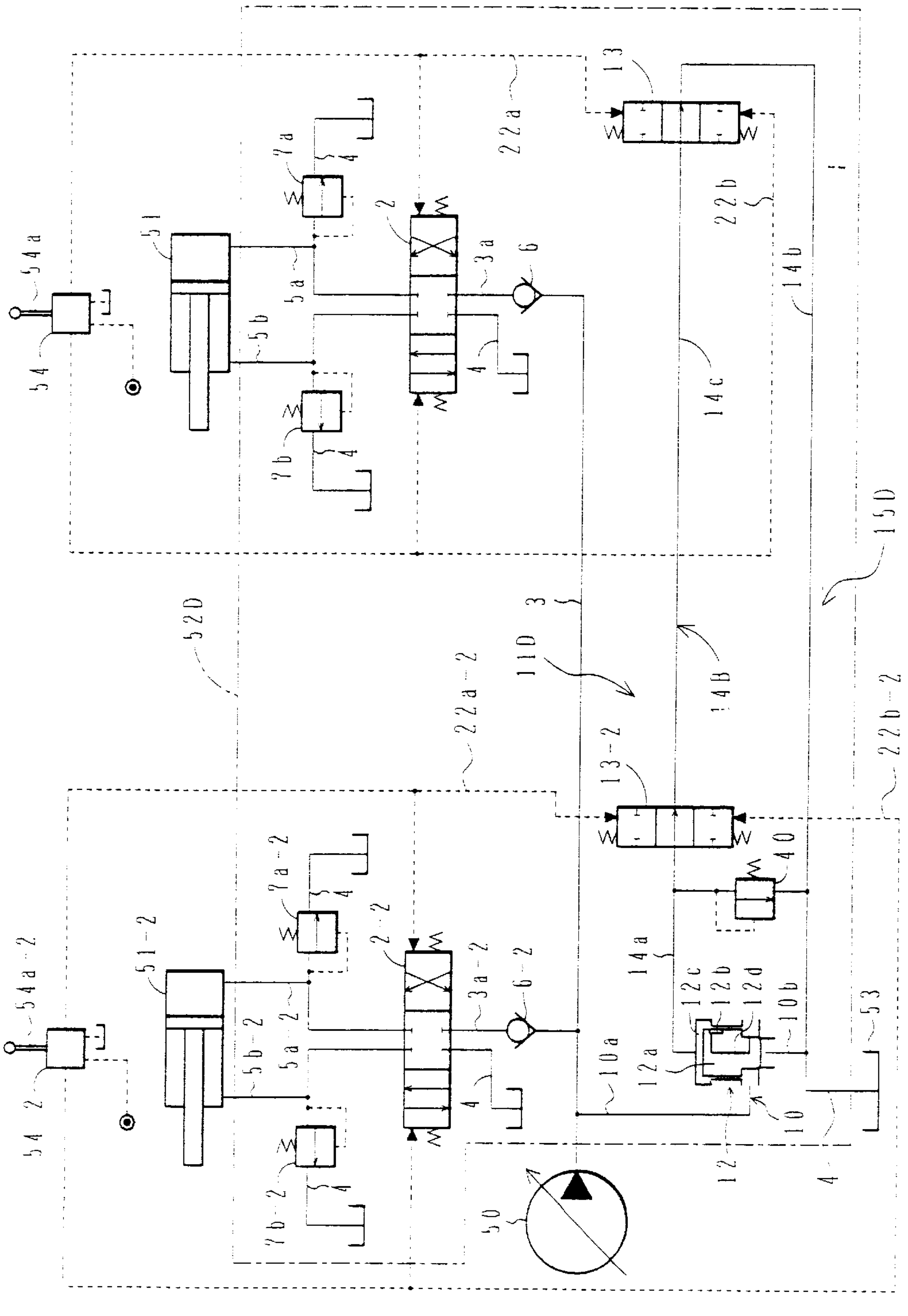
FIG. 10 is a hydraulic circuit diagram of a hydraulic drive system and a directional control valve apparatus according to a fifth embodiment of the present invention.
Figure 11:
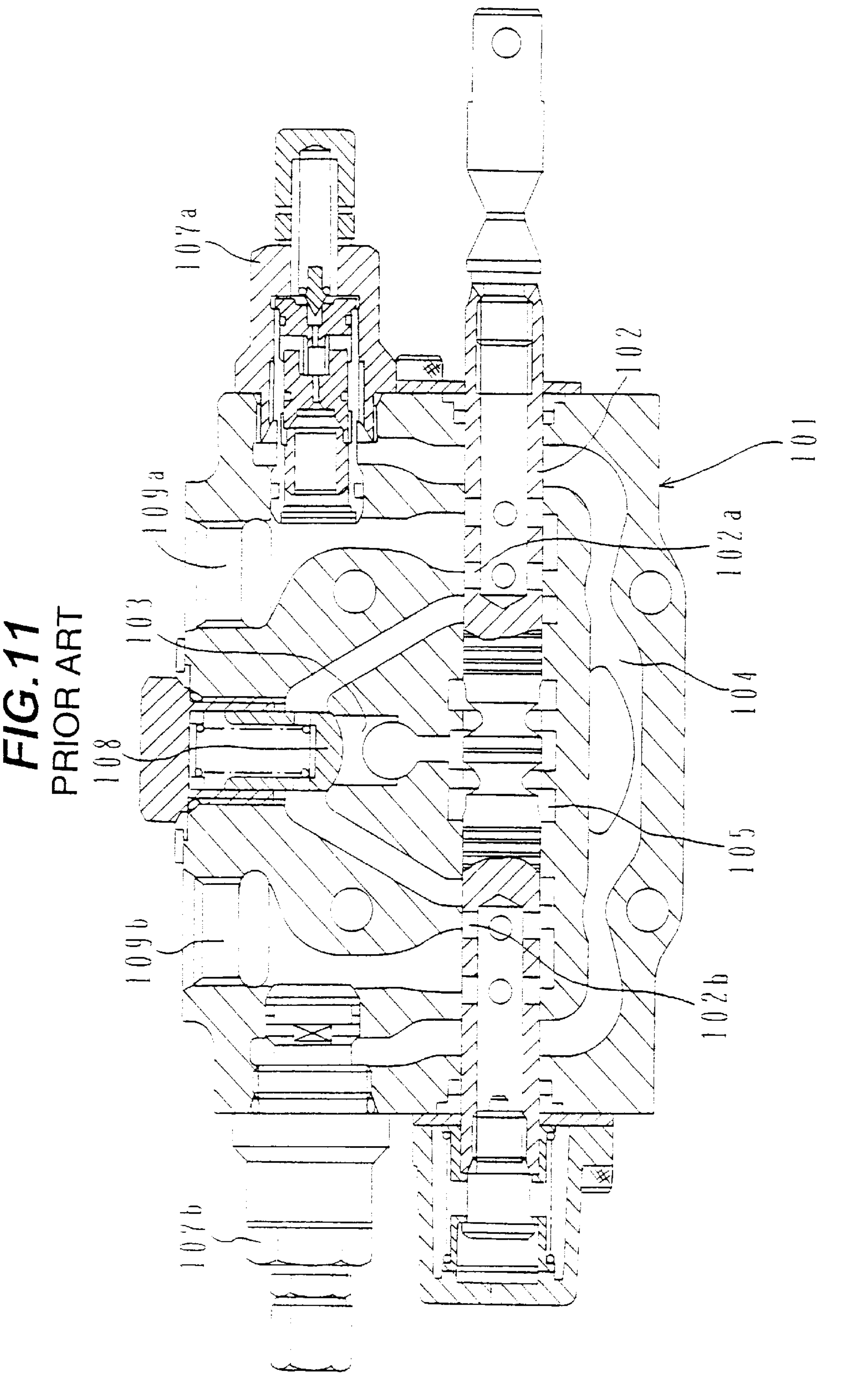
FIG. 11 PRIOR ART
FIG. 11 is a sectional diagram showing the structure of a conventional valve apparatus including an open center directional control valve.

A fifth embodiment of the present invention will be described with reference to FIG. 10. In FIG. 10, equivalent members to those shown in FIGS. 1 and 5 are denoted by the same reference numerals.

Referring to FIG. 10, a pilot circuit 15D of throttle and cutoff means 11C included in a directional control valve apparatus 52D of this embodiment has a relief valve 40 connected in parallel to the sub-spool 13-2 as shown. When the pressure in the passage portion 14*a* of the pilot passage 14B rises in excess of the setting pressure of the relief valve 40, part or all of the pilot flow is drained to the reservoir 53 through the reservoir port 4.

With this embodiment thus constructed, when the pressure in the pilot passage 14*a* in which the pressure rises in relation to the feeder port 3 rises in excess of the setting pressure, the relief valve 40 is opened to lower the pressure in the back pressure chamber 12*c* of the logic valve 12, whereupon the valve body 12*a* of the logic valve 12 cutting off the communication between the feeder port 3 and the reservoir port 4 is moved upward on the drawing. Accordingly, the relief valve 40 can set an upper limit of the maximum pressure imposed on the feeder port 3.

Thus, by providing the relief valve 40 in the pilot passage 14*a* instead of a conventional large-sized relief valve which has been used to release a large flow rate supplied from the hydraulic pump 50, and releasing the pilot flow through the relief valve 40, an equivalent function to that obtained by the conventional relief valve can be achieved and the construction of the hydraulic drive system and the directional control valve apparatus can be further simplified.

INDUSTRIAL APPLICABILITY

According to the present invention, the axial length of the spool of the directional control valve can be shortened without impairing the function of an open center directional control valve, and an improvement in machining accuracy and a more compact structure can be realized. In addition, an equivalent function to that obtained by the open center directional control valve can be developed with no need of using a controller, and the manufacture cost of the directional control valve can be cut down.

Also, according to the present invention, in a directional control valve apparatus which is constructed as a multiple valve including a plurality of main spools arranged side by side, a weight reduction of the housing corresponding to need of no bypass port is achieved in proportion to the number of the main spools. As a result, the housing can be greatly reduced in weight and size and the manufacture cost can be considerably cut down.

What is claimed is:

1. A hydraulic drive system comprising a hydraulic pump, an actuator driven by a hydraulic fluid delivered from said hydraulic pump, a closed center directional control valve connected to said hydraulic pump through a hydraulic fluid supply line and controlling a flow of the hydraulic fluid supplied to said actuator, an unloading circuit interconnecting the hydraulic fluid supply line of said hydraulic pump and a reservoir, and throttle and cutoff means installed in said unloading circuit for throttling and cutting off said unloading circuit depending on an amount by which said directional control valve is operated, wherein:

said throttle and cutoff means comprises a logic valve, a pilot circuit including a pilot variable throttle to control a rate of a pilot flow for controlling an opening area of said logic valve depending on the rate of the pilot flow, and operation interlock means for changing an opening of said pilot variable throttle depending on the operation amount of said directional control valve;

wherein said logic valve comprises a valve body of the seat valve type arranged to close and open said unloading circuit between an inlet portion connected to said hydraulic fluid supply line and an outlet portion connected to said reservoir, a back pressure chamber formed to face a back side end of said valve body, and a feedback slit formed in said valve body to allow said inlet portion to communicate with said back pressure chamber in such a manner that an opening area of said feedback slit changes depending on an amount by which said valve body is moved, said pilot circuit being connected such that said pilot flow is formed to pass through said inlet portion of the logic valve, said feedback slit and back pressure chamber of the logic valve and said pilot variable throttle to said reservoir; and wherein the hydraulic drive system further comprises a pilot valve for outputting a pilot pressure as an operation signal and driving said directional control valve, and said operation interlock means comprises means for introducing the same pilot pressure output from said pilot valve to said directional control valve and said pilot variable throttle of said throttle and cutoff means.

2. A hydraulic drive system according to claim 1, wherein a relief valve is disposed in parallel to said pilot variable throttle of said throttle and cutoff means.

3. A hydraulic drive system according to claim 1, wherein said operation interlock means reduces the opening of said pilot variable throttle as the operation amount of said directional control valve increases.

4. A hydraulic drive system according to claim 1, wherein flow rate detecting means for detecting the rate of the pilot flow is disposed between said pilot variable throttle of said throttle and cutoff means and said reservoir, a delivery rate of said hydraulic pump being regulated by using a signal generated by said flow rate detecting means.

5. A hydraulic drive system according to claim 1, wherein said actuator and said directional control valve are each provided in plural number, and said pilot variable throttle of said throttle and cutoff means is provided in plural number corresponding to said plurality of directional control valves, said plurality of pilot variable throttles being connected in series.

6. A directional control valve apparatus comprising a valve housing, a msin spool slidably disposed in said housing and communicating a feeder port connected to a hydraulic pump with load ports connected to an actuator, an unloading circuit interconnecting said feeder port and a reservoir port connected to a reservoir, and throttle and cutoff means installed in said unloading circuit for throttling and cutting off said unloading circuit depending on an amount by which said main spool is operated, wherein:

said throttle and cutoff means comprises a logic valve, a sub-spool including a pilot variable throttle to control a rate of a pilot flow for controlling an opening area of said logic valve depending on the rate of the pilot flow, said sub-spool being configured to reduce an opening of said pilot variable throttle as said sub-spool displaces from a neutral position, and operation interlock means for displacing said sub-spool depending on the operation amount of said main spool;

wherein said logic valve comprises a valve body of the seat valve type arranged to close and open said unloading circuit between an inlet portion connected to said feeder port and an outlet portion connected to said reservoir port, a back pressure chamber formed to face a back side end of said valve body, and a feedback slit formed in said valve body to allow said inlet portion to communicate with said back pressure chamber in such a manner that an opening area of said feedback slit changes depending on an amount by which said valve body is moved, said pilot variable throttle of said sub-spool being connected such that said pilot flow is formed to pass through said inlet portion of the logic valve, said feedback slit and back pressure chamber of the logic valve and said pilot variable throttle to said reservoir port; and wherein said operation interlock means comprises means for communicating pilot pressure bearing chambers defined at both ends of said main spool respectively with pilot pressure bearing chambers defined at both ends of said sub-spool.

7. A directional control valve apparatus according to claim 6, wherein said main spool and said sub-spool are arranged in said housing parallel to each other.

8. A directional control valve apparatus according to claim 6, further comprising a load check valve disposed in an inlet portion of said main spool for preventing a hydraulic fluid from flowing backward from said load ports to said feeder port, said sub-spool being arranged parallel to said main spool on the side opposite to said load check valve with said main spool positioned therebetween.

9. A directional control valve apparatus according to claim 6, wherein said valve apparatus is constructed as a multiple valve including a plurality of main spools arranged side by side, and corresponding plural sets of combination of said main spools and sub-spools are installed in said valve housing, said plurality of sub-spools being connected in series.

10. A directional control valve apparatus according to claim 6, wherein flow rate detecting means for detecting the rate of the pilot flow is disposed between said sub-spool and said reservoir port, a delivery rate of said hydraulic pump being regulated by using a signal generated by said flow rate detecting means.

11. A directional control valve apparatus according to claim 6, wherein a relief valve is disposed in parallel to said sub-spool.

* * * * *